(12) United States Patent
Zagaynov

(10) Patent No.: US 11,341,757 B2
(45) Date of Patent: May 24, 2022

(54) TRAINING LANGUAGE MODELS USING TEXT CORPORA COMPRISING REALISTIC OPTICAL CHARACTER RECOGNITION (OCR) ERRORS

(71) Applicant: ABBYY Production LLC, Moscow (RU)

(72) Inventor: Ivan Germanovich Zagaynov, Dolgoprudniy (RU)

(73) Assignee: ABBYY Development Inc., Moscow (RU)

( * ) Notice: Subject to any disclaimer, the term of this patent is extended or adjusted under 35 U.S.C. 154(b) by 18 days.

(21) Appl. No.: 16/375,478

(22) Filed: Apr. 4, 2019

(65) Prior Publication Data

US 2020/0311459 A1 Oct. 1, 2020

(30) Foreign Application Priority Data

Mar. 29, 2019 (RU) .......................... RU2019109198

(51) Int. Cl.

| | |
|---|---|
| *G06K 9/34* | (2006.01) |
| *G06V 30/148* | (2022.01) |
| *G06N 20/00* | (2019.01) |
| *G06F 40/20* | (2020.01) |
| *G06T 5/00* | (2006.01) |
| *G06V 30/10* | (2022.01) |

(52) U.S. Cl.
CPC ............ *G06V 30/153* (2022.01); *G06F 40/20* (2020.01); *G06N 20/00* (2019.01); *G06T 5/002* (2013.01); *G06V 30/10* (2022.01)

(58) Field of Classification Search
CPC .... G06F 40/20; G06K 2209/01; G06K 9/344; G06N 20/00; G06T 5/002
See application file for complete search history.

(56) References Cited

U.S. PATENT DOCUMENTS

| | | | |
|---|---|---|---|
| 6,480,621 B1 * | 11/2002 | Lyon ........................ | G06N 3/08 |
| | | | 382/157 |
| 10,157,425 B2 | 12/2018 | Chelst et al. | |
| 10,489,682 B1 * | 11/2019 | Kumar ..................... | G06K 9/18 |
| | (Continued) | | |

FOREIGN PATENT DOCUMENTS

| | | |
|---|---|---|
| CN | 103761710 | 4/2014 |
| RU | 2628436 C1 | 8/2017 |
| | (Continued) | |

OTHER PUBLICATIONS

Thomas M. Breuel, "The OCRopus Open Source OCR System", DFKI and U. Kaiserslautern, Kaiserslautern, Germany, 15 pages.

(Continued)

*Primary Examiner* — Manuchehr Rahmjoo
(74) *Attorney, Agent, or Firm* — Lowenstein Sandler LLP

(57) ABSTRACT

Systems and methods for generating text corpora comprising realistic optical character recognition (OCR) errors and training language models using the text corpora are provided. An example method comprises: generating, by a computer system, an initial set of images based on an input text corpus comprising text; overlaying, by the computer system, one or more simulated defects over the initial set of images to generate an augmented set of images; generating an output text corpus based on the augmented set of image; and training, using the output text corpus, a language model for optical character recognition.

20 Claims, 8 Drawing Sheets

(56) References Cited

U.S. PATENT DOCUMENTS

| | | |
|---|---|---|
| 2009/0067726 A1 | 3/2009 | Erol et al. |
| 2009/0070110 A1 | 3/2009 | Erol et al. |
| 2009/0074300 A1 | 3/2009 | Hull et al. |
| 2011/0310110 A1 | 12/2011 | Lookingbill et al. |
| 2015/0379422 A1 | 12/2015 | Chandler |
| 2016/0328366 A1* | 11/2016 | Elarian ................ G06F 40/129 |
| 2016/0350900 A1 | 12/2016 | Barron |

FOREIGN PATENT DOCUMENTS

| | | |
|---|---|---|
| RU | 2635257 C1 | 11/2017 |
| RU | 2679988 C1 | 2/2019 |
| RU | 2721187 C1 | 5/2020 |
| WO | 2018165579 A1 | 9/2018 |

OTHER PUBLICATIONS

Prasad Pai, "Data Augmentation Techniques in CNN using Tensorflow", Oct. 25, 2017, 12 pages.

Samuel Dodge et al., "Understanding How Image Quality Affects Deep Neural Networks", Arizona State University, Apr. 21, 2016, 6 pages.

Tinku Acharya et al., "Image Processing Principles and Applications", Wiley-Interscience Publication, 2005, 451 pages.

Fisher Yu et al., "Multi-Scale Context Aggregation By Dilated Convolutions", Published as a conference paper at ICLR Apr. 30, 2016, 13 pages.

\* cited by examiner

335 Adding lightsource

340

345 defocus

350

355 Digital noise

360

392

395

TRAINING LANGUAGE MODELS USING TEXT CORPORA COMPRISING REALISTIC OPTICAL CHARACTER RECOGNITION (OCR) ERRORS

REFERENCE TO RELATED APPLICATIONS

The present application claims the benefit of priority under 35 U.S.C. § 119 to Russian Patent Application No. RU2019109198, filed Mar. 29, 2019, the disclosure of which is incorporated by reference herein.

The present application is related to U.S. patent application Ser. No. 16/137,981, entitled "TRAINING IMAGE-PROCESSING NEURAL NETWORKS BY SYNTHETIC PHOTOREALISTIC INDICIA-BEARING IMAGES," filed Sep. 21, 2018, which is assigned to the assignee of the present application and is hereby incorporated by reference in its entirety.

TECHNICAL FIELD

The present disclosure is generally related to computer systems, and is more specifically related to systems and methods for generating text corpora comprising realistic optical character recognition (OCR) errors and training language models using the text corpora.

BACKGROUND

Optical character recognition (OCR) process may extract computer-readable and searchable textual information from indicia-bearing images of various media (such as printed or handwritten paper documents, banners, posters, signs, billboards, and/or other physical objects bearing visible text symbols (including encoded text symbols, such as barcodes) on one or more of their surfaces). Before being fed to an OCR process, input images may be pre-processed by one or more convolutional neural networks which correct certain image defects.

SUMMARY OF THE DISCLOSURE

In accordance with one or more aspects of the present disclosure, an example method of training image processing neural networks by synthetic photorealistic indicia-bearing images may comprise: generating, by a computer system, an initial set of images based on an input text corpus comprising text; overlaying, by the computer system, one or more simulated defects over the initial set of images to generate an augmented set of images comprising text segments; generating an output text corpus based on the augmented set of images; and training, using the output text corpus, a language model for optical character recognition.

In accordance with one or more aspects of the present disclosure, an example system for training image processing neural networks by synthetic photorealistic indicia-bearing images may comprise: a memory; a processing device, coupled to the memory, the processing device configured to: generate an initial set of images based on an input text corpus comprising text; overlay one or more simulated defects over the initial set of images to generate an augmented set of images comprising text segments; generate an output text corpus based on the augmented set of images; and train, using the output text corpus, a language model for optical character recognition.

In accordance with one or more aspects of the present disclosure, an example computer-readable non-transitory storage medium may comprise executable instructions that, when executed by a processing device, cause the processing device to: generate an initial set of images based on an input text corpus comprising text; overlay one or more simulated defects over the initial set of images to generate an augmented set of images; generate an output text corpus based on the augmented set of images; and train, using the output text corpus, a language model for optical character recognition.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
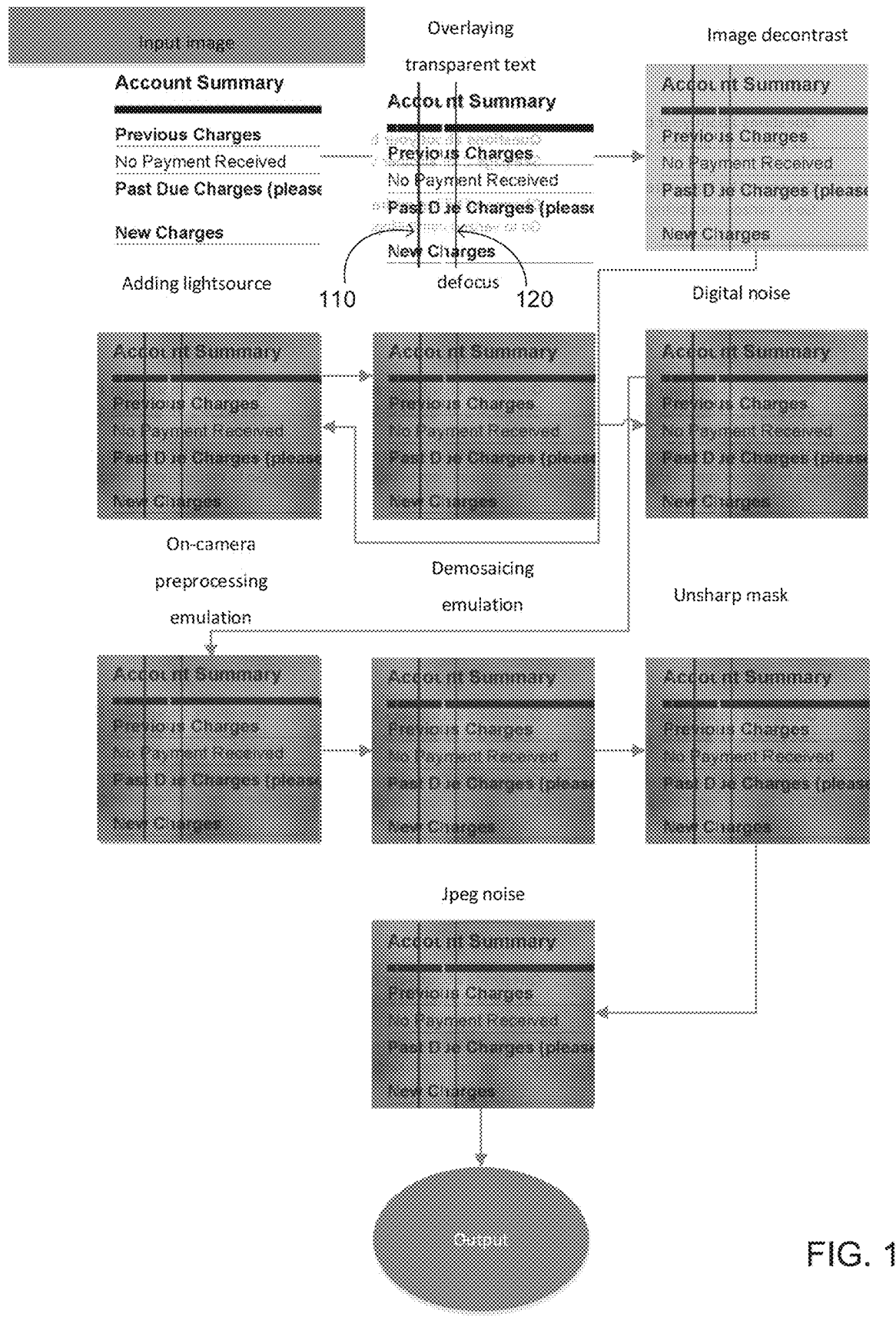
FIG. 1 depicts an example photography emulation process implemented in accordance with one or more aspects of the present disclosure.

Described herein are methods and systems for generating text corpora comprising realistic optical character recognition (OCR) errors and training language models using the text corpora.

Character recognition may involve recognizing text and other content in an image using machine learning models that are trained for OCR purposes ("language models"). Existing methods of training language models typically train language models by sampling synthetic data obtained from text corpora. For example, the existing methods may utilize noise pollution and samples of OCR errors present in a given text corpus. In such methods, OCR errors present in a text may be artificially generated, for example, using error probability tables for graphemes and symbols. However, the existing methods of training language models are ineffective because synthetic OCR errors may be of poor quality and may be incorrect. In addition, the synthetic OCR errors may be positioned in wrong places in an image and thus may not represent real OCR errors presented in a document. As such, the existing methods of generation of synthetic data for training of language models may be incapable to providing data representing real OCR errors that may occur in a document produced by OCR. The language models trained using such synthetic data may produce poor quality results.

The systems and methods described herein represent significant improvements over the existing methods of training language models, by providing a method for generating text corpora comprising realistic OCR errors and training language models using the text corpora. The method may include generating a plurality of images based on an input text corpus comprising text. For example, the method may divide the text corpus (e.g., one or more text documents) into multiple segments and may generate an image for each of the multiple segments. The method can then add one or more simulated defects to each of the images. The simulated defects may represent any defect that may be present in an image (also referred to as "image defect"), such as one or more printing defects, scanning defects, photo defects, etc. Each of the simulated defects may include one or more lines, spots, and/or any other defects that may be present in a document to be processed using OCR technologies. Upon adding the simulated defects to the images, the method may then perform OCR on the images to generate OCR processed images. The OCR processed images may then be provided by the method as one or more output text corpora. Accordingly, the output text corpora include realistic OCR errors that may contain context-dependent information. The output text corpora may then be used to train machine learning models for performing OCR, such as language models using word embeddings and/or character embeddings. Utilizing the output text corpora produced by the systems and methods of the present disclosure for training neural networks processing language models results in significant improvements in the image recognition quality, thus improving the overall efficiency of various applications, such as an optical character recognition (OCR) process which extracts textual information from the images.

In an illustrative example, a computer system implementing the methods described herein may perform the photography emulation process, as schematically illustrated by FIG. 1. The photography emulation process may involve overlaying a transparent text and one or more simulated defects (e.g., defects 110 and/or 120 of FIG. 1) over the input image, deconstructing the image, emulating an additional source at the imaged scene, defocusing the image, introducing digital noise, emulating image pre-processing by the image acquiring device (e.g., photo camera), emulating image de-mosaicing, applying an unsharp mask to the image, introducing JPEG noise into the image, and/or performing various other image processing operations. These image processing operations would yield an augmented set of images of indicia-bearing objects. The images processed by the trained neural networks may be subjected to the OCR process which extracts textual information from the images. Various aspects of the above referenced methods and systems are described in details herein below by way of examples, rather than by way of limitation.

Figure 2:
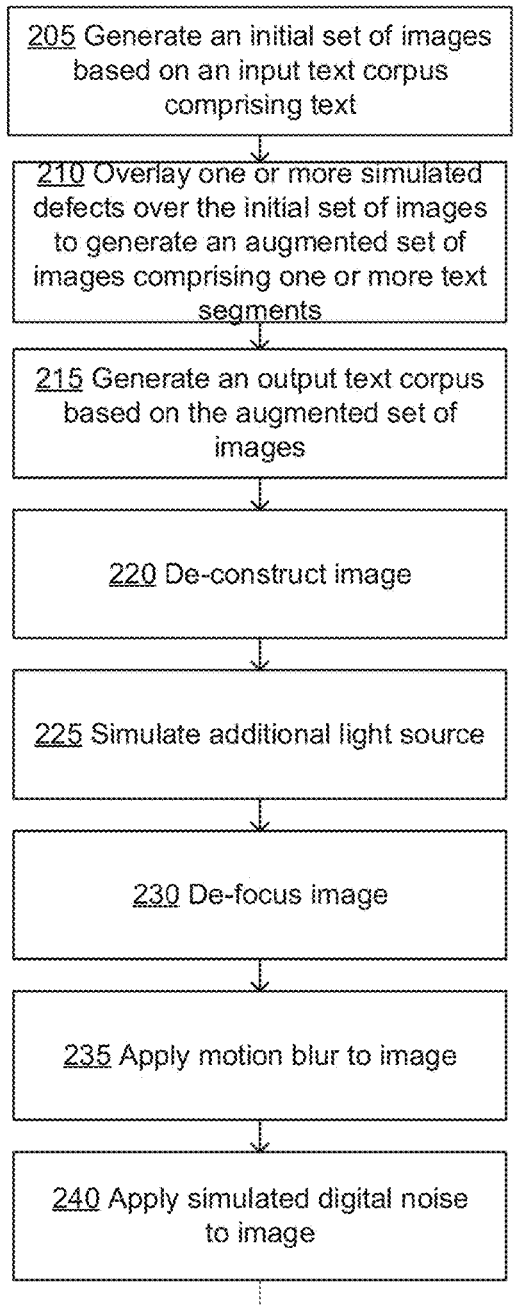
FIG. 2 depicts a flow diagram of an example method of training a language model using text corpora comprising realistic OCR errors and context-dependent information in accordance with one or more aspects of the present disclosure.
Figure 2:
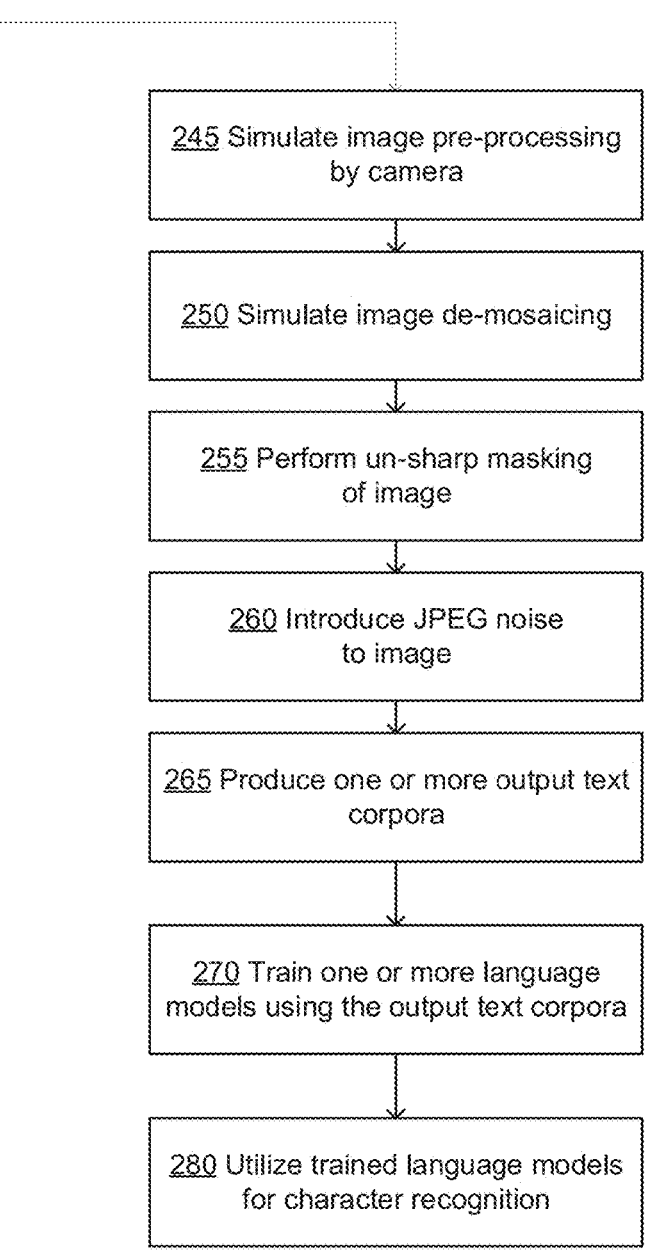

FIG. 2 depicts a flow diagram of one illustrative example of a method 200 of training language models in accordance with one or more aspects of the present disclosure. Method 200 and/or each of its individual functions, routines, subroutines, or operations may be performed by one or more processors of the computer system (e.g., example computer system 500 of FIG. 5) executing the method. In certain implementations, method 200 may be performed by a single processing thread. Alternatively, method 200 may be performed by two or more processing threads, each thread executing one or more individual functions, routines, subroutines, or operations of the method. In an illustrative example, the processing threads implementing method 200 may be synchronized (e.g., using semaphores, critical sections, and/or other thread synchronization mechanisms). Alternatively, the processing threads implementing method 200 may be executed asynchronously with respect to each other. Therefore, while FIG. 2 and the associated description lists the operations of method 200 in certain order, various implementations of the method may perform at least some of the described operations in parallel and/or in arbitrary selected orders.

At block 205, the computer system implementing the method may generate an initial set of images based on one or more input text corpora. Each of the input text corpora may include one or more electronic documents including text. In some embodiments, one or more of the electronic documents may include straight text (e.g., one or more Rich Text Format (RTF) files). In some embodiments, a text corpus of the input corpora may be and/or include an electronic document including a continuous text. To generate the initial set of images, the computer system may divide the input text corpora into one or more segments. Each of the segments may correspond to one or more pages, lines, textual strings, etc. In some embodiments, the text input corpus may be segmented into a plurality of segments based on one or more predetermined rules. For example, the text input corpus may be segmented by word boundaries. As another example, the text input corpus may be segmented so that each of the segments includes a certain number of symbols (e.g., 80 symbols per string of text). As a further example, the text input corpus may be segmented into sentences.

Each image of the initial set of images may represent a rendering of one or more segments of the text input corpus. The rendering may be performed using various fonts, resolutions, and/or other rendering process parameters. In some embodiments, the initial set of images may include black and white images. The initial set of images may be stored in one or more files of a pre-defined format, such as PDF files. In certain implementations, the neural networks trained by the methods of the present disclosure may be tested (validating) by utilizing validation sets of images containing known texts, which may be rendered and rasterized using pre-defined or dynamically adjustable rendering and rasterization parameters.

At blocks 210-260, the computer system may process the initial set of images to produce an augmented image set. The image processing may introduce various image defects into the initial set of images (e.g., imperfections and/or distortions such as defocusing, blur, glare, etc.) by adding simulated defects corresponding to the image defects to the initial set of images. The image defects may represent any defect that may be present in photographically acquired images, scanned images, printed images, and/or images obtained in any other manner. For example, the augmented image set may include one or more augmented images including one or more simulated defects corresponding to the image defects. Processing the initial set of images and/or producing the augmented images may involve generation of images comprising simulated distortions of images with different parameters varying dependent of distortion types needed and may thus enable production of unlimited distorted image sets. In various implementations, at least some of the operations described herein below with references to blocks 210-260 may be omitted; furthermore, the order of the image processing operations described herein below with references to blocks 210-260 may be varied.

Figure 3A:
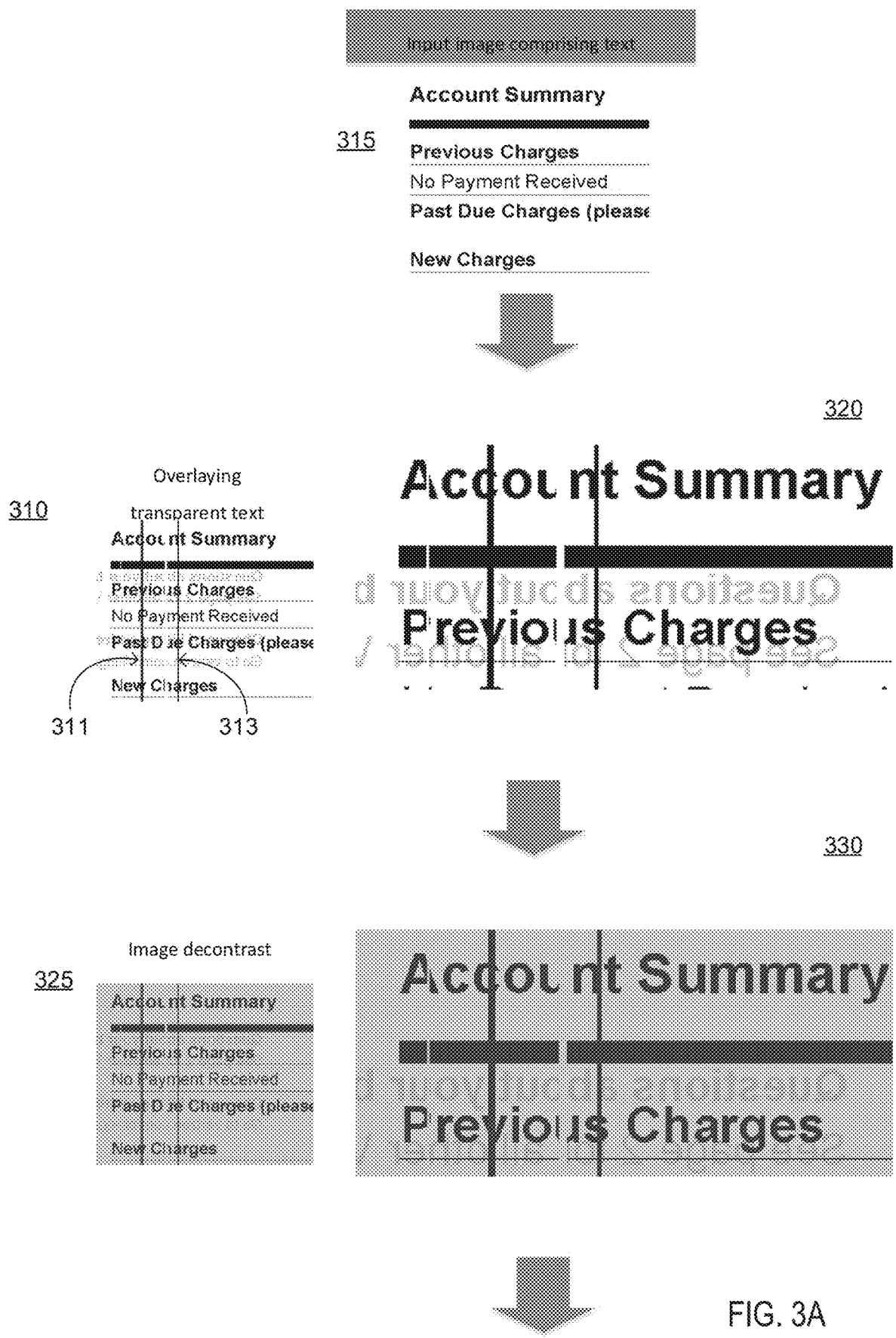
FIGS. 3A-3D schematically illustrate various image processing operations which may be employed for generating photorealistic indicia-bearing images, in accordance with one or more aspects of the present disclosure.
Figure 4:
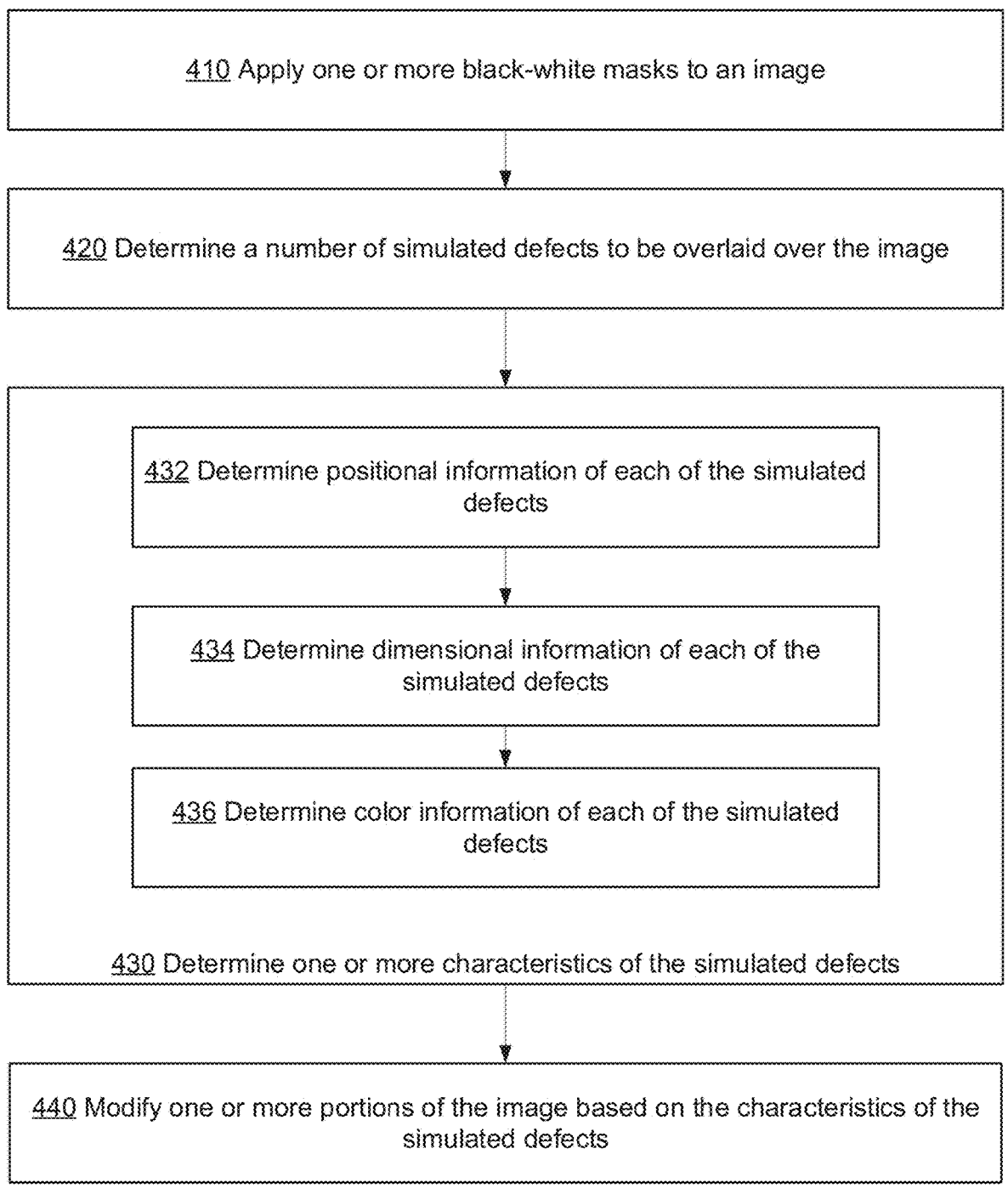
FIG. 4 is an example of a method for generating a text corpus comprising realistic OCR errors in accordance with one or more aspects of the present disclosure.

At block 210, the computer system may overlay one or more simulated defects over the initial set of images. Examples of the simulated defects may include one or more lines (e.g., vertical lines, horizontal lines, lines of any other suitable orientation), spots (circle spots, elliptical spots, etc.), and/or any other defects that may present in an electronic document (e.g., a document to be processed using OCR techniques). In one implementation, a single type of simulated defects (e.g., lines) may be overlaid over the initial set of images. For example, as illustrated in FIG. 3A, simulated defects 311 and 313 may be overlaid over an input image 315 that comprises text. Each of the simulated defects 311 and 313 may include a line. In another implementation, multiple types of simulated defects (e.g., lines and spots) may be overlaid over the initial set of images. To overlay the simulated defects, the computer system may determine one or more characteristics of each of the simulated defects, such as positional information of each of the simulated defects (e.g., one more coordinates defining where the simulated defect is located in an image), dimensional information of each of the simulated defects (e.g., a width, length, size, etc. of a line, a radius of a circle spot, a major axis and/or a minor axis of an elliptical spot, etc.), a color of each of the simulated defects (e.g., black, white, etc.). The computer system may then overlay the simulated defects over the initial set of images based on the determined characteristics. For example, the computer system may modify one or more portions of the images based on the characteristics of the simulated defects (e.g., by identifying one or more pixels in an image corresponding to positional information of a simulated defect and changing the brightness of the identified pixels in accordance with the color information of the simulated defect). In some embodiments, the simulated defects may be added to one or more images of the initial images by performing one or more operations described in conjunction with FIG. 4 below.

In particular, at block 215, the computer system may superimpose, on one or more images generated at block 210, a transparent image of a pre-defined or randomly generated text. Parts of the transparent image may be completely invisible within the fragments where the transparent image intersects with the base image ("full transparency"). Alternatively, parts of the transparent image may be partially visible within the fragments where the transparent image intersects with the base image ("partial transparency" or "translucency"). As schematically illustrated by FIG. 3A, operation 310 of overlaying a transparent text over the source image 315 produces the output image 320.

At block 220, the computer system may de-contrast a generated image, i.e., reduce the maximum difference in the luminance or brightness of the generated image pixels by a pre-defined value, e.g., 0.1 or 0.2 of the initial maximum difference. As schematically illustrated by FIG. 3A, operation 325 of de-contrasting the source image 320 thus producing the output image 330.

Figure 3B:
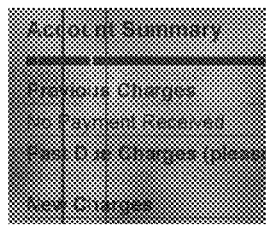
Figure 3B:
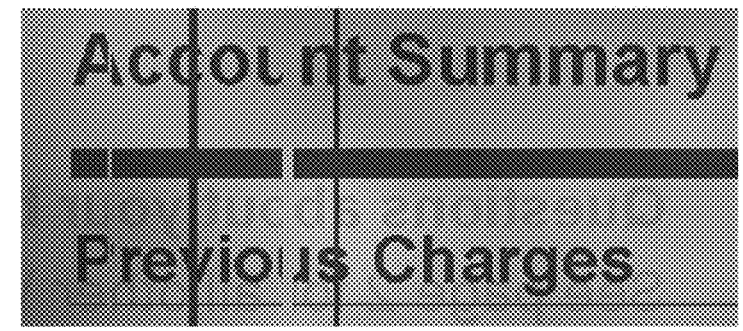
Figure 3B:
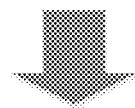
Figure 3B:
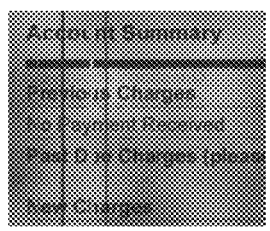
Figure 3B:
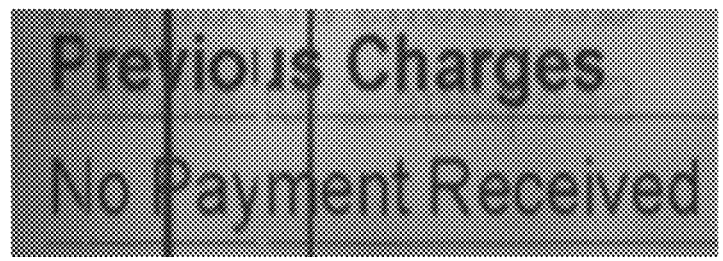
Figure 3B:
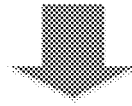
Figure 3B:
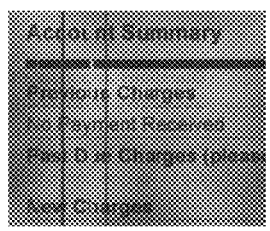
Figure 3B:
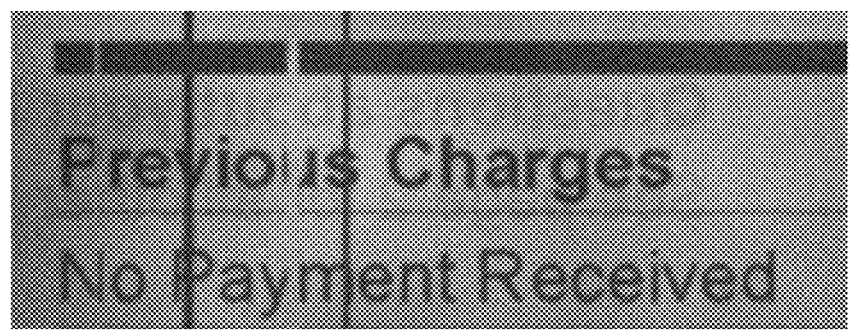
Figure 3B:
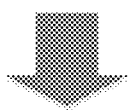

At block 225, the computer system may simulate an additional light source in the imaged scene, by additively applying, to at least a subset of the image pixels, extra-low frequency Gaussian noise of a low amplitude, thus emulating gradient transitions between lighter and darker image fragments. As schematically illustrated by FIGS. 3A-3B, operation 335 of simulating an additional light source in the imaged scene would process the input image 330 and produce the output image 340.

At block 230, the computer system may at least partially de-focus the image, e.g., by applying Gaussian blur with a pre-defined or dynamically adjustable radius, which may be selected from a pre-defined or dynamically adjustable the range (e.g., 0.7-3.0). As schematically illustrated by FIG. 3B, operation 345 of de-focusing the input image 340 produces the output image 350.

At block 235, the computer system may superimpose a motion blur on the image, thus simulating movement of the imaged objects within the exposure period determined by the shutter speed.

At block 240, the computer system may apply, to at least a subset of the image pixels, a simulated digital noise, such as Gaussian noise of a pre-defined or dynamically-adjustable amplitude, e.g., not exceeding 20 units of the image brightness, or not exceeding 0.15 of the image brightness range. As schematically illustrated by FIG. 3B, operation 355 of introducing digital noise into the input image 350 produces the output image 360.

Figure 3C:
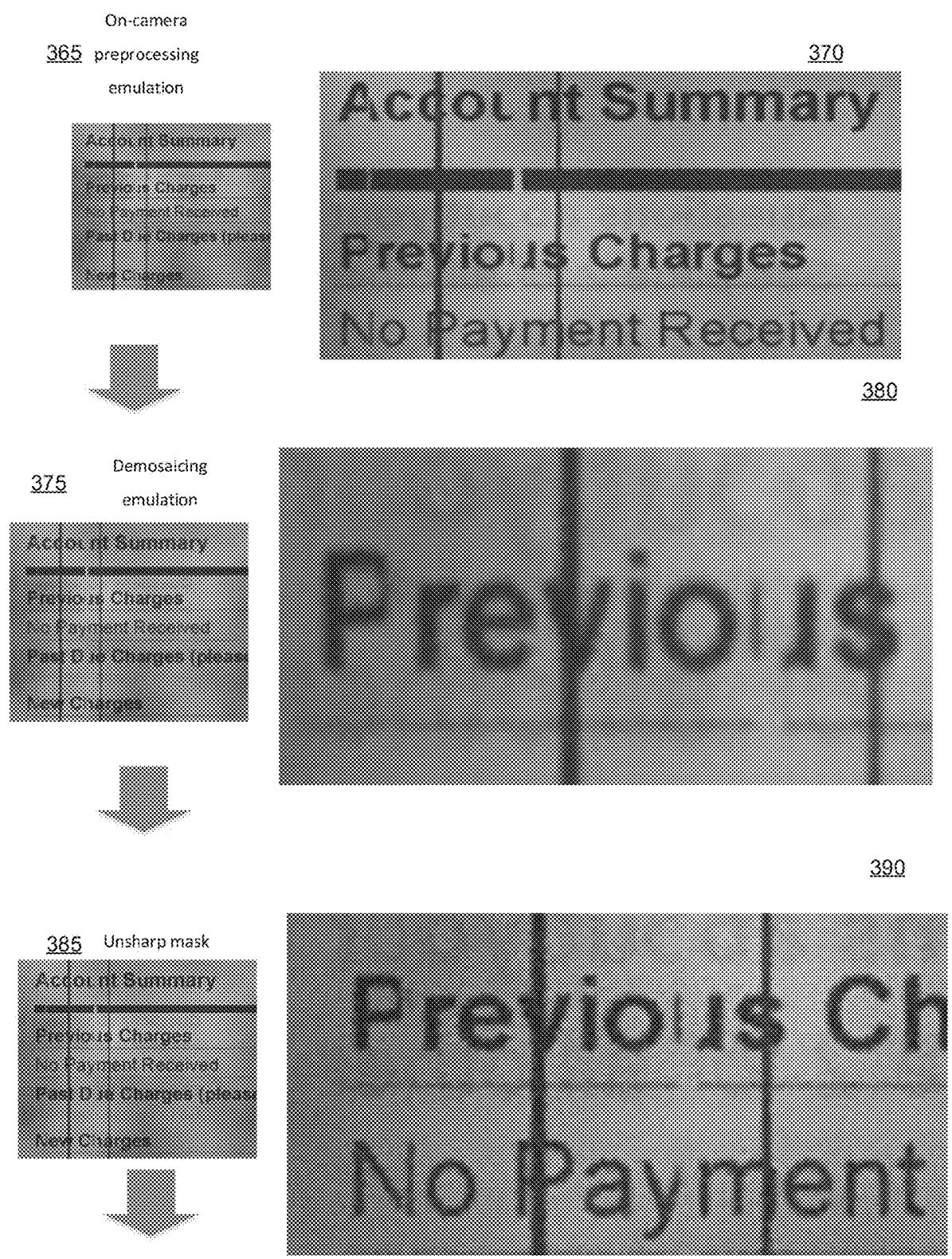

At block 245, the computer system may simulate image pre-processing performed by the image acquiring camera, e.g., by applying a sigma filter to at least a subset of the image pixels. As schematically illustrated by FIGS. 3B-3C, the emulated image pre-processing operation 365 of the input image 360 produces the output image 370.

At block 250, the computer system may simulate image de-mosaicing, which is a process of reconstructing a full color image from the incomplete color samples produced by an image sensor overlaid with a color filter array (CFA). In certain implementations, the image de-mosaicing may involve applying Gaussian blur with a pre-defined or dynamically adjustable sigma value (e.g., 0.1, 0.2, 0.3 or other value). Besides, the image de-mosaicing may further involve applying light Gaussian smoothing to the image. The Gaussian smoothing operator is a two-dimensional convolution operator which may be utilized to blur images and remove detail and noise. As schematically illustrated by FIG. 3C, operation 375 of de-mosaicing the input image 370 produces the output image 380.

At block 255, the computer system may perform un-sharp masking of at least a subset of the image pixels, which is an image processing technique utilizing a blurred, or "unsharp", negative image to create a mask of the original image. The un-sharped mask is then combined with the positive (original) image, creating an image that is less blurry than the original. The un-sharp mask may be represented by a linear or nonlinear filter which amplifies high-frequency components of the input signal. In certain implementations, the computer system may emulate an un-sharping operation performed by a particular camera model by applying un-sharp mask parameter values which are implemented by the camera. As schematically illustrated by FIG. 3C, the operation 385 of un-sharping the input image 380 produces the output image 390.

Figure 3D:
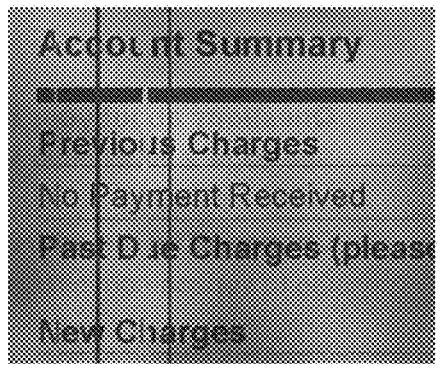
Figure 3D:
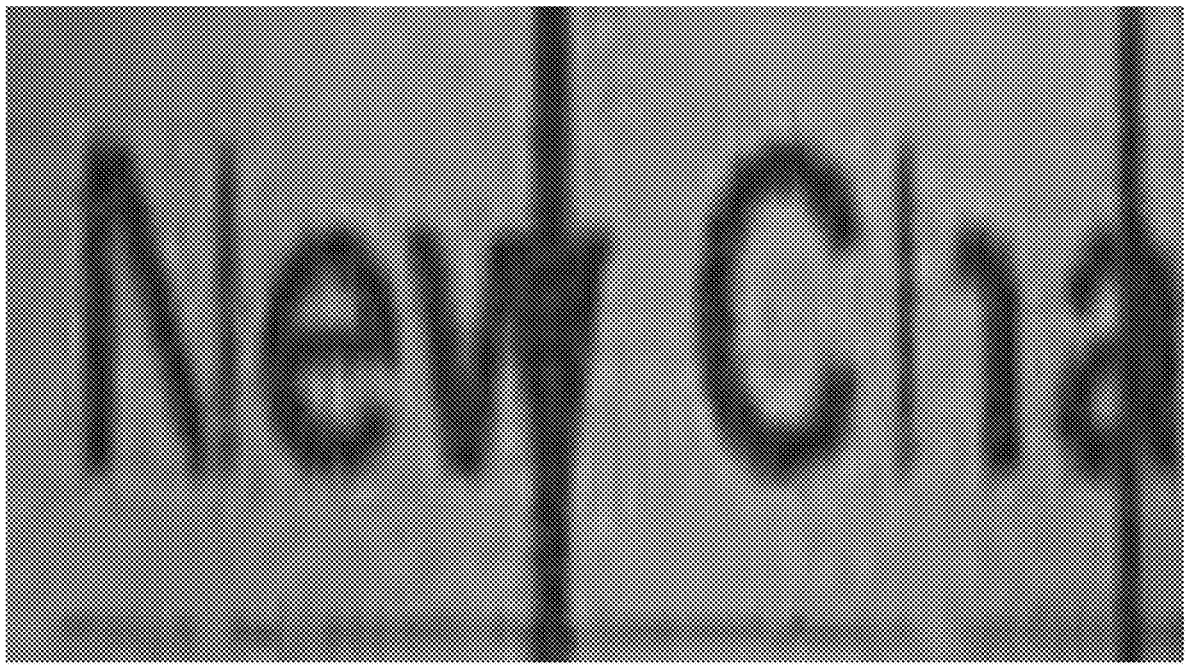

At block 260, the computer system may introduce JPEG noise, i.e., random variations of brightness or color information. The noise may be introduced, e.g., by saving the image in JPEG format of a pre-defined or dynamically adjusted quality (e.g., selected from the range 2-80) and subsequent decompressing of the saved JPEG image. As schematically illustrated by FIGS. 3C-3D, operation 392 of introducing JPEG noise into the input image 390 produces the output image 395.

The initial set of images may be processed by one or more of the above-referenced image processing operations while varying the operation parameters, thus producing an augmented set of images. Each of the augmented set of images may include one or more text segments.

Thus, the image processing operations described herein above with reference to blocks 225-260 yield an augmented set of images comprising one or more text segments and simulated defects corresponding to one or more image defects.

At block 265, the computer system can generate one or more output text corpora based on the augmented set of images. For example, the computer system may perform OCR on the distorted set of images of one or more of text segments to recognize text in the augmented set of images.

The OCR may be performed using any suitable OCR method (e.g., an OCR method that is to use the language models trained using the output text corpora, a random OCR method and/or model, an arbitrary OCR method and/or model). Since the output text corpora are generated based on the augmented set of images including simulated defects corresponding to image defects present in various types of images (e.g., printed images, photo images, scanned images), the output text corpora may be regarded as including realistic OCR errors and context-dependent information.

At block 270, the computer system can train, using the one or more output text corpora, one or more language models for character recognition. The one or more trained language models may be used for performing character recognition on a document. The trained language models may include one or more language models using word embeddings and/or character embeddings. A word embedding may be a vector representative of a word. A character embedding may be vector representative of a character. The word embedding and/or the character embedding may be a vector of real numbers which may be produced, e.g., by a neural network implementing a mathematical transformation on words using embedding functions. As an example, a language model using word embeddings may receive an input representing a word and can map the word to a word embedding. A language model using character embeddings may receive an input representing a character and can map the character to a character embedding. A language model as described herein may use both word embeddings and character embeddings in some embodiments.

The one or more language models may include one or more neural networks, such as one or more recurrent neural networks (RNNs), long short-term memory (LSTM) RNNs, bidirectional RNNs, bidirectional LSTMs, etc. A recurrent neural network (RNN) may be a neural network that is capable of maintaining the network state reflecting the information about the inputs which have been processed by the network, thus allowing the network to use their internal state for processing subsequent inputs. For example, the recurrent neural network may receive an input vector by an input layer of the recurrent neural network. A hidden layer of the recurrent neural network processes the input vector. An output layer of the recurrent neural network may produce an output vector. The network state may be stored and utilized for processing subsequent input vectors to make subsequent predictions.

In some embodiments, the language models may include one or more neural networks which may be employed for image binarization and correcting the image blur and/or shadow and highlight enhancement. In various implementations, various other neural networks may be trained on the datasets comprising pairs of images, in which one image is drawn from the initial set of images and another image is drawn from the augmented set of images.

In some embodiments, the language models may include a convolutional neural network, which may be a computational model based on a multi-staged algorithm that applies a set of pre-defined functional transformations to a plurality of inputs (e.g., image pixels) and then utilizes the transformed data to perform pattern recognition. A convolutional neural network may be implemented as a feed-forward artificial neural network in which the connectivity pattern between its neurons is inspired by the organization of the animal visual cortex. Individual cortical neurons respond to stimuli in a restricted region of space known as the receptive field. The receptive fields of different neurons partially overlap such that they tile the visual field. The response of an individual neuron to stimuli within its receptive field can be approximated mathematically by a convolution operation. Neurons from adjacent layers are connected by weighted edges. The edge weights and/or other network parameters are defined at the network training stage based on the training dataset.

In an illustrative example, training the network involves activating the convolutional neural network for every input in the training dataset. A value of a pre-defined loss function is computed based on the observed output of the convolutional neural network and the desired output specified by the training data set, and the error is propagated back to the previous layers of the convolutional neural network, in which the weights and/or other network parameters are adjusted accordingly. This process may be repeated until the value of the loss function falls below a predetermined threshold.

At block 280, the trained language models may be used for character recognition. For example, an input image including unknown text content may be processed using one or more of the trained language models to recognize the unknown text content Referring to FIG. 4, an example 400 of a method for generating a text corpus comprising realistic OCR errors in accordance with one or more aspects of the present disclosure is shown. Method 400 and/or each of its individual functions, routines, subroutines, or operations may be performed by one or more processors of the computer system (e.g., example computer system 500 of FIG. 5) executing the method. In certain implementations, method 400 may be performed by a single processing thread. Alternatively, method 400 may be performed by two or more processing threads, each thread executing one or more individual functions, routines, subroutines, or operations of the method. In an illustrative example, the processing threads implementing method 400 may be synchronized (e.g., using semaphores, critical sections, and/or other thread synchronization mechanisms). Alternatively, the processing threads implementing method 400 may be executed asynchronously with respect to each other. Therefore, while FIG. 4 and the associated description lists the operations of method 400 in certain order, various implementations of the method may perform at least some of the described operations in parallel and/or in arbitrary selected orders.

At block 410, the computer system can apply one or more black-white masks to an image. The application of a black-white mask to the image may convert one or more pixels in a portion of the image into either a black pixel or a white pixel. In some embodiments, the black-white masks may be obtained from a database of PDF images.

At block 420, the computer system can determine a number of simulated defects to be overlaid over the image. The image may be an image of the initial set of images as described in connection with FIG. 2 above. The computer system may determine any suitable number of simulated defects. For example, the computer system may determine a random number of simulated defects (e.g., 8, 9, 10, or any other suitable value) are to be overlaid over image. The simulated defects may include a single type of simulated defects (e.g., lines) or multiple types of simulated defects (e.g., lines and/or spots).

At block 430, the computer system can determine one or more characteristics of each of the simulated defects to be overlaid over the image. Examples of the characteristics may include positional information, dimensional information, colors, etc. In some embodiments, the characteristics of the simulated defects may be determined by performing one or more operations descried in conjunction with blocks 532-536 below.

At block 432, the computer system can determine positional information for each of the simulated defects. The positional information of a given simulated defect may include one or more coordinates in the image, such as a coordinate defining a vertical line, a coordinate defining a horizontal line, a coordinate defining a center of a circle corresponding to a spot, etc. In some embodiments, the computer may assign one or more random coordinates to each of the simulated defects to be overlaid over the image. For example, the computer system can assign, to each of a plurality of simulated defects of a particular type (e.g., vertical lines), a random coordinate of a value ranging from 0 to a value corresponding to a width of the image. In some embodiments, the random coordinate may be determined using a uniform distribution.

At block 434, the computer system can determine dimensional information of each of the simulated defects. The dimensional information of a given simulated defect may define one or more dimensions and/or a size of the simulated defect. In some embodiments, the computer system may assign a random value to a dimension or size of a simulated defect. The random value may be determined based on a distribution of the dimensions and/or sizes of the simulated defects (e.g., a normal distribution or any other suitable distribution). For example, the computer can determine a width for each of a plurality of vertical lines to be overlaid over the image. In some embodiments, the width for each of the vertical lines may be a random width selected from a normal distribution with a given average value. The average value may be set by the computer system and may be any suitable value (e.g., 3, 4 pixels). In some embodiments, a variance of the distribution may be a squared root of the width mean value. If a negative value of the width is chosen, a new value of the width (e.g., a positive value) may be generated. As another example, the computer can determine a length of each of the vertical lines to be overlaid over the image. As still another example, the computer system may determine a radius of a circle spot by assigning random values to radiuses of a plurality of circle spots to be added to the image based on a normal distribution or any other suitable distribution. As a further example, the computer system may determine a major axis and/or a minor axis of an elliptical spot by assigning random values to radiuses of a plurality of elliptical spots to be overlaid over the image based on a normal distribution or any other suitable distribution. In some embodiments, the computer system can vary a percentage of recognition errors depending on the number, types, and width of the simulated defects. For example, the percentage of recognition errors can be specifically chosen for learning a specific language model.

At block 436, the computer system may determine color information for each of the simulated defects to be overlaid over the image. For example, the color information of a given simulated defect may include a color, such as black, white, etc. The color information of the given simulated defect may be represented by one or more values of one or more color components (e.g., a red component, a blue component, a green component), one or more values of brightness and/or intensity, etc. In some embodiments, the color information of a respective simulated defect and/or the number of the simulated defects may be determined so that the simulated defects overlaid over the image can satisfy a probability of errors (e.g., 50%). In some embodiments, the computer system can vary a percentage of recognition errors depending on the color(s) of the simulated defects. For example, the percentage of recognition errors can be specifically chosen for learning a specific language model.

At block 440, the computer system can modify one or more portions of the image based on the characteristics of the simulated defects to overlay the simulated defects over the image. For example, the computer system may identify one or more portions of the image (e.g., one or more pixels of the image) based on positional information and/or dimensions of a given simulated defect (e.g., coordinates defining a location of a line in the image, a width, a length, and/or a size defining the line). The computer system can then modify the identified pixels by adjusting values of the identified pixels (e.g., pixel values representing the brightness, intensity, color, etc. of the identified pixels) in accordance with the color of the given simulated defect. As an example, the computer system can replace the identified pixels with black or other dark pixels to overlay a black simulated defect (e.g., a black line). As another example, the computer system can replace the identified pixels with white or other light pixels to overlay a white simulated defect to the image (e.g., a white line).

Thus, the present disclosure describes systems and methods for generating text corpora comprising realistic OCR errors and context-dependent information, where the text corpora may be obtained by performing OCR on augmented images comprising text segments. Language models for OCR (e.g., language models using word embeddings, language models using words and/or characters embeddings) utilizing the generated text corpora. Therefore, the quality of OCR results may be improved using the learned language models in accordance with the present disclosure.

Figure 5:
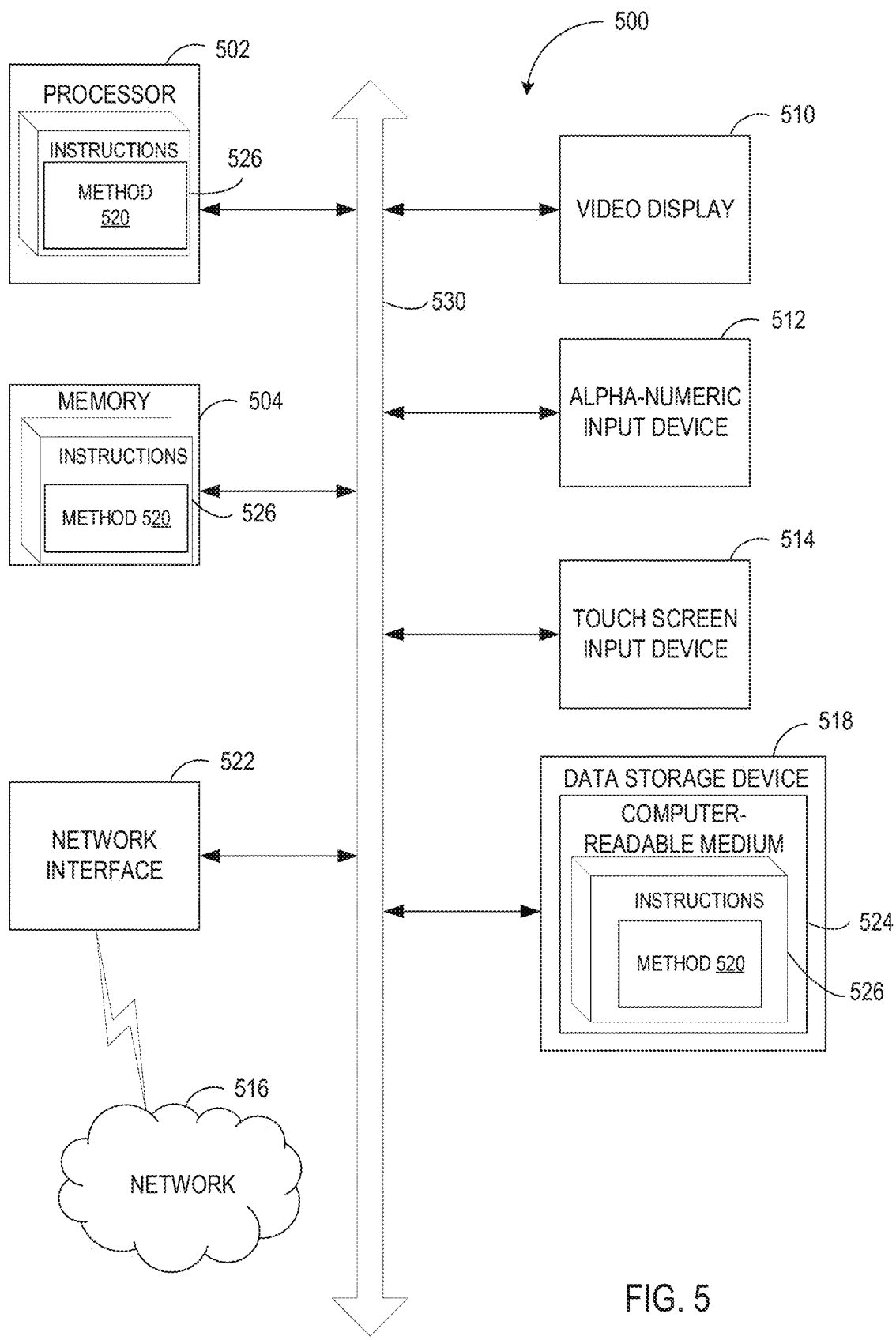
FIG. 5 depicts a component diagram of an example computer system which may be employed for implementing the methods described herein.

FIG. 5 depicts a component diagram of an example computer system which may be employed for implementing the methods described herein. The computer system 500 may be connected to other computer system in a LAN, an intranet, an extranet, or the Internet. The computer system 500 may operate in the capacity of a server or a client computer system in client-server network environment, or as a peer computer system in a peer-to-peer (or distributed) network environment. The computer system 500 may be a provided by a personal computer (PC), a tablet PC, a set-top box (STB), a Personal Digital Assistant (PDA), a cellular telephone, or any computer system capable of executing a set of instructions (sequential or otherwise) that specify operations to be performed by that computer system. Further, while only a single computer system is illustrated, the term "computer system" shall also be taken to include any collection of computer systems that individually or jointly execute a set (or multiple sets) of instructions to perform any one or more of the methods described herein.

Exemplary computer system 500 includes a processor 502, a main memory 504 (e.g., read-only memory (ROM) or dynamic random access memory (DRAM)), and a data storage device 518, which communicate with each other via a bus 530.

Processor 502 may be represented by one or more general-purpose processing devices such as a microprocessor, central processing unit, or the like. More particularly, processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. Processor 502 may also be one or more special-purpose processing devices such as an application specific integrated circuit (ASIC), a field programmable gate array (FPGA), a digital signal processor (DSP), network processor, or the like. Processor 502 is configured to execute instructions 526 for performing the methods described herein.

Computer system 500 may further include a network interface device 522, a video display unit 510, a character input device 512 (e.g., a keyboard), and a touch screen input device 514.

Data storage device 518 may include a computer-readable storage medium 524 on which is stored one or more sets of instructions 526 embodying any one or more of the methods or functions described herein. Instructions 526 may also reside, completely or at least partially, within main memory 504 and/or within processor 502 during execution thereof by computer system 500, main memory 504 and processor 502 also constituting computer-readable storage media. Instructions 526 may further be transmitted or received over network 516 via network interface device 522.

In certain implementations, instructions 526 may include instructions of method 520 for implementing in accordance with one or more aspects of the present disclosure. Method 520 may include methods 200 and/or 400 of FIGS. 2 and 4. While computer-readable storage medium 524 is shown in the example of FIG. 5 to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methods of the present disclosure. The term "computer-readable storage medium" shall accordingly be taken to include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and software components, or only in software.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "determining", "computing", "calculating", "obtaining", "identifying," "modifying" or the like, refer to the actions and processes of a computer system, or similar electronic computer system, that manipulates and transforms data represented as physical (e.g., electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Various other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method, comprising:
   generating, by a computer system, an initial set of images based on an input text corpus comprising text;
   determining, by the computer system, one or more characteristics of one or more simulated defects of a particular type, wherein determining the one or more characteristics comprises:
      determining positional information of each of the simulated defects, wherein the positional information comprises one or more coordinates randomly assigned to the one or more simulated defects, the one or more randomly assigned coordinates to be within a range of values from an initial value to a value corresponding to a width of an image of the initial set of images;
   overlaying, by the computer system, the one or more simulated defects of the particular type over the initial set of images to generate an augmented set of images comprising one or more text segments based on the one or more characteristics of the one or more simulated defects;
   generating an output text corpus based on the augmented set of images; and
   training, using the output text corpus, a language model for optical character recognition.

2. The method of claim 1, wherein generating the initial set of images further comprises:
   segmenting the input text corpus into a plurality of segments;

generating a rendering of one or more of the segments; and generating one or more images comprising one or more of the segments.

3. The method of claim 1, wherein the one or more simulated defects comprise a line or a spot in one or more of the augmented set of images.

4. The method of claim 1, wherein the one or more simulated defects represent at least one of a printing defect, a scanning defect, or a photo defect.

5. The method of claim 1, wherein overlaying the one or more simulated defects over the initial set of images further comprises:

modifying one or more portions of an image of the initial set of images based on the one or more characteristics of the one or more simulated defects.

6. The method of claim 5, wherein determining the one or more characteristics of the simulated defects further comprises:

determining dimensional information of each of the simulated defects.

7. The method of claim 5, wherein determining the one or more characteristics of the simulated defects further comprises:

determining color information of each of the simulated defects.

8. The method of claim 5, wherein determining the one or more characteristics of the simulated defects further comprises selecting a number of the simulated defects to be overlaid onto one or more of the initial set of images.

9. The method of claim 5, wherein modifying one or more portions of the image of the initial set of images based on the one or more characteristics of the simulated defects comprises:

adjusting values of one or more pixels in the image of the initial set of images based on the characteristics of the one or more simulated defects.

10. The method of claim 1, further comprising varying a number of realistic optical character recognition (OCR) errors in the output text corpus for learning a plurality of language models, wherein the realistic OCR errors comprise context-dependent information.

11. The method of claim 1, wherein generating the output text corpus based on the augmented set of images comprises performing optical character recognition on the augmented set of images.

12. The method of claim 1, wherein the language model for optical character recognition comprises at least one of a language model using word embeddings or a language model using character embeddings.

13. The method of claim 1, wherein the input text corpus comprises straight text.

14. A system, comprising:

a memory;

a processing device, coupled to the memory, the processing device to:

generate an initial set of images based on an input text corpus comprising text;

determine one or more characteristics of one or more simulated defects of a particular type, wherein determining the one or more characteristics comprises:

determining positional information of each of the simulated defects, wherein the positional information comprises one or more coordinates randomly assigned to the one or more simulated defects, the one or more randomly assigned coordinates to be within a range of values from an initial value to a value corresponding to a width of an image of the initial set of images;

overlay the one or more simulated defects of the particular type over the initial set of images to generate an augmented set of images comprising one or more text segments based on the one or more characteristics of the one or more simulated defects;

generate an output text corpus based on the augmented set of images; and train, using the output text corpus, a language model for optical character recognition.

15. The system of claim 14, wherein, to generate the initial set of images, the processing device is further to:

segment the input text corpus into a plurality of segments;

generate a rendering of one or more of the segments; and obtain one or more images comprising one or more of the segments.

16. The system of claim 15 wherein the one or more simulated defects comprise a line or a spot in one or more of the augmented set of images.

17. The system of claim 15, wherein the simulated defects represents at least one of a printing defect, a scanning defect, or a photo defect.

18. The system of claim 14, wherein, to overlay the one or more simulated defects over the initial set of images, the processing device is further to:

modify one or more portions of an image of the initial set of images based on the one or more characteristics of the one or more simulated defects.

19. The system of claim 18, wherein the one or more characteristics further comprise at least one of dimensional information of the simulated defects, a number of the simulated defects, or color information of each of the simulated defects.

20. A computer-readable non-transitory storage medium comprising executable instructions that, when executed by a processing device, cause the processing device to:

generate an initial set of images based on an input text corpus comprising text;

determine one or more characteristics of one or more simulated defects of a particular type, wherein determining the one or more characteristics comprises:

determining positional information of each of the simulated defects, wherein the positional information comprises one or more coordinates randomly assigned to the one or more simulated defects, the one or more randomly assigned coordinates to be within a range of values from an initial value to a value corresponding to a width of an image of the initial set of images;

overlay the one or more simulated defects of the particular type over the initial set of images to generate an augmented set of images based on the one or more characteristics of the one or more simulated defects;

generate an output text corpus based on the augmented set of image comprising text segments; and train, using the output text corpus, a language model for optical character recognition.

* * * * *